June 4, 1929.                H. BÉNIT                1,715,978
LUBRICATING DEVICE FOR VERTICAL SHAFTS
Filed May 18, 1927
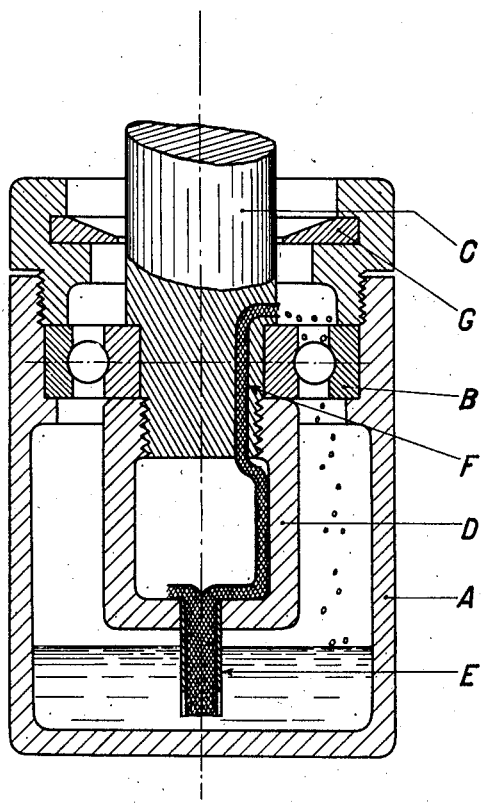
Inventor
Henri Bénit
By Marion & Marion
Attorneys Patented June 4, 1929.

1,715,978

UNITED STATES PATENT OFFICE.

HENRI BÉNIT, OF PARIS, FRANCE.

LUBRICATING DEVICE FOR VERTICAL SHAFTS.

Application filed May 18, 1927, Serial No. 192,448, and in France July 16, 1926.

Splash lubrication or lubrication by continuous displacement of the bearing in the lubricant (oil, grease, glycerine or other lubricating body) causes energy losses due to friction either between the bearing in the lubricant or between the lubricant itself and the walls of the surrounding casing.

These energy losses are considerable in the case of shafts rotating at very high speeds.

The arrangement forming the subject of the present invention permits of reducing to a considerable extent these energy losses; the invention consists in permitting the lubricating liquid to rise in consequence of the combined action of capillarity and of centrifugal force through the medium of wicks rotating with the shaft and discharging the lubricant in the form of particles (small drops) for example on the balls or other parts of the bearing. The lubricating liquid by virtue of the arrangement in question returns by leakage into the fixed reservoir where it is collected and from which it is reabsorbed for use once more.

The invention will be understood more clearly from the accompanying drawing which is given solely by way of example.

The single figure of drawing is a vertical section through a shaft and bearing to which the present invention has been applied.

Referring to the drawing, the arrangement includes a fixed casing A containing lubricant and serving to support the bearing B which in the example illustrated is a ball-bearing, a shaft C on which the bearing is mounted and on which is suitably arranged an end cover D, and a tube E mounted on the cover axially of the shaft C. This tube E is formed at its lower end with a number of grooves for increasing the surface of contact with the lubricant. The shaft C is provided in its end with a number of channels F in which are disposed wicks which project through the end cover D and are collected together in the tube E projecting into the lubricant, the level of which lubricant is located beneath the surface of the end cover so as to avoid contact therewith. An oil ring G is provided to prevent unnecessary creeping of the oil along the shaft C and to return said oil to the reservoir. A different form of baffle from that shown in the drawings may be employed.

A reduction in friction results from the fact that the lubricant is discharged in small quantities and consequently there is only slight loss of energy while automatic lubrication with the recovery of the lubricant is obtained. Since the lubricant flows in a closed cycle, loss of the latter is reduced to a considerable extent thus ensuring great economy. No outlet or filling means are shown in the drawing. These may be arranged in any known manner.

Having now particularly described and ascertained the nature of my said invention and in what manner the same is to be performed, I declare that what I claim is:—

A device of the character described for lubricating a vertical shaft, comprising a hollow cylindrical casing secured to the lower end of a vertical shaft bearing and adapted to contain a quantity of fluid lubricant, a cylindrical hollow cover fixed to the lower end of the shaft, a downwardly depending pipe at the exact middle of said cover and in line with the axis of the shaft, said pipe being adapted to dip a short distance into a quantity of oil in the bottom of the casing, one or several wicks in the pipe and along the peripheral inner portion of the cover, said wicks being threaded in bores provided in the shaft longitudinally thereof and opening into the periphery of the shaft adjacent the upper part of the shaft bearing.

In witness whereof I have hereunto set my hand.

HENRI BÉNIT.